(12) United States Patent
Morriello et al.

(10) Patent No.: US 10,697,319 B2
(45) Date of Patent: Jun. 30, 2020

(54) INTEGRATED WASHING SYSTEM FOR GAS TURBINE ENGINE

(71) Applicant: Nuovo Pignone Srl, Florence (IT)

(72) Inventors: Pierenzo Morriello, Florence (IT);
Gianfranco Pittella, Florence (IT);
Daniele Marcucci, Florence (IT);
Marco Frattallone, Florence (IT)

(73) Assignee: Nuovo Pignone S.r.l. (IT)

( * ) Notice: Subject to any disclaimer, the term of this patent is extended or adjusted under 35 U.S.C. 154(b) by 969 days.

(21) Appl. No.: 15/034,403

(22) PCT Filed: Oct. 30, 2014

(86) PCT No.: PCT/EP2014/073320
§ 371 (c)(1),
(2) Date: May 4, 2016

(87) PCT Pub. No.: WO2015/063206
PCT Pub. Date: May 7, 2015

(65) Prior Publication Data
US 2016/0273381 A1    Sep. 22, 2016

(30) Foreign Application Priority Data

Nov. 4, 2013 (IT) .............................. CO2013A0056

(51) Int. Cl.
*F01D 25/00* (2006.01)
*F02C 7/055* (2006.01)
(Continued)

(52) U.S. Cl.
CPC ............ *F01D 25/002* (2013.01); *F02C 7/052* (2013.01); *F02C 7/055* (2013.01); *F04D 29/705* (2013.01);
(Continued)

(58) Field of Classification Search
CPC ...... F01D 25/002; F01D 25/00; F04D 29/705; F02C 7/052; F02C 7/055; F05D 2230/72;
(Continued)

(56) References Cited

U.S. PATENT DOCUMENTS 4,158,449 A * 6/1979 Sun ........................ B01D 46/10
244/136
4,622,050 A * 11/1986 O'Connor .......... B01D 46/0068
55/283

(Continued)

FOREIGN PATENT DOCUMENTS

| CN | 2132009 Y | 5/1993 |
| CN | 2661968 Y | 12/2004 |

(Continued)

OTHER PUBLICATIONS

Decision to Grant issued in connection with corresponding RU Application No. 2016115931 dated May 14, 2018.
(Continued)

*Primary Examiner* — Dwayne J White
*Assistant Examiner* — Danielle M. Christensen
(74) *Attorney, Agent, or Firm* — Baker Hughes Patent Organization (57) ABSTRACT

A washing system is described for a gas turbine engine with an axial compressor, comprising: an inlet screen at the air flow inlet of the compressor to protect the compressor from foreign object damage, an arrangement of nozzles and manifolds for spraying the washing liquid, and a washing liquid supply system connected to the arrangement; the inlet screen comprises a supporting structure and a filtering net fixed to the supporting structure; the arrangement of nozzles and manifolds is integrated in the supporting structure of the inlet screen.

10 Claims, 7 Drawing Sheets

(51) Int. Cl.
*F04D 29/70* (2006.01)
*F02C 7/052* (2006.01)

(52) U.S. Cl.
CPC ...... *F05D 2220/32* (2013.01); *F05D 2230/72* (2013.01)

(58) Field of Classification Search
CPC .. F05D 2220/32; F05D 2250/50; F02B 77/04; F02B 2077/045
See application file for complete search history.

(56) References Cited

U.S. PATENT DOCUMENTS

| | | | |
|---|---|---|---|
| 5,494,006 A | | 2/1996 | Davis, Jr. |
| 7,454,913 B1 | | 11/2008 | Tassone et al. |
| 8,479,754 B2 | * | 7/2013 | Hjerpe .............. B08B 3/02 134/172 |
| 2003/0133789 A1 | | 7/2003 | Kuesters et al. |
| 2008/0078422 A1 | | 4/2008 | Wagner |
| 2015/0052865 A1 | * | 2/2015 | Jackson ........... B01D 46/0024 55/487 |
| 2015/0101641 A1 | * | 4/2015 | Rice ................. F02B 77/04 134/22.11 |

FOREIGN PATENT DOCUMENTS

| | | |
|---|---|---|
| CN | 2929284 Y | 8/2007 |
| CN | 201347903 Y | 11/2009 |
| FR | 1116789 A | 5/1956 |
| JP | 2007-046587 A | 2/2007 |
| RU | 2 178 532 C2 | 1/2002 |
| RU | 2 260 701 C2 | 9/2005 |
| RU | 2 343 299 C2 | 1/2009 |
| RU | 2 369 762 C2 | 10/2009 |
| RU | 2 611 104 C2 | 2/2017 |
| WO | 2003048545 A1 | 6/2003 |

OTHER PUBLICATIONS

Machine Translation and Notification of Reasons for Refusal issued in connection with corresponding JP Application No. 2016-527451 dated Aug. 14, 2018.
Unofficial English Translation of Chinese Office Action issued in connection with corresponding CN Application No. 201480060415.6 dated Nov. 16, 2016.
Italian Search Report and Written Opinion issued in connection with corresponding IT Application No. CO2013A000056 dated Jul. 14, 2014.
International Search Report and Written Opinion issued in connection with corresponding PCT Application No. PCT/EP2014/073320 dated Jan. 26, 2015.

* cited by examiner

INTEGRATED WASHING SYSTEM FOR GAS TURBINE ENGINE

BACKGROUND

Embodiments of the subject matter disclosed herein relate to washing systems, gas turbine engines, and methods of washing axial compressors.

Gas turbines are widely used as for power generators, for gas compression and in general for all the applications where it is required a rotating mechanical drive. A core element of a gas turbine engine is the compressor through which during operation huge quantity of air is drawn in and compressed. Burners add heat to the compressed air and the expanding combustion gases drive the turbine from which useful power can be extracted. The quality of air entering the compressor is a very important factor for the lifetime and the efficiency of the gas turbine. Such air contains various types of materials in form of aerosols like dirt and corrosive particles. Even if the majority of particles exits the gas turbine with the exhaust gases, a part of them can still deposit on the blades and vanes of the compressor especially on the front end where they eventually accumulate, deteriorating the aerodynamics and thus reducing the efficiency and the performances of the machine, resulting in great economic losses for the user. The flux of harmful particles leads also to other problems like FOD (Foreign Object Damage) and corrosion. For all these reasons measures have to be taken to control the quality of the air entering the gas turbine.

Normally the gas turbine inlet is equipped with air filters that block at least the particles having dimensions higher than a certain minimum. Still enough particles of smaller dimensions will be able to pass the filter system, adhering and accumulating on the blades and vanes of the compressor. This phenomenon, called "fouling", makes necessary to resort to regular periodical washing of the gas turbine compressor to eliminate the deposits of these particles on the blades and vanes, trying in this way to recover the most of the compressor original performances. Washing the gas path of the compressor is normally accomplished by spraying washing fluids, through a series of nozzles that atomize such fluids, into the compressor intake and letting the rotor to rotate forcing the washing fluids through the compressor till they exit at the back of the machine. Normally, the washing operations are performed under two conditions, one so called "on-line" because the cleaning is done while the machine is operating, while the other washing method requires the machine to be off production and thus is called "off-line".

The "on-line" washing is regarded as less effective than the "off-line", because the machine is operating at full load and there are restrictions on the positions where to put the nozzles. In fact, due to the very high velocity of the air it is common to locate the nozzles in positions where the air stream has a low velocity and the washing liquid can penetrate into the center of the air flow otherwise due to the turbulence of the air flow and to the centrifugal force the washing liquid will move towards the periphery away from the blades. On top of this, high temperature tends to evaporate the washing liquids. An advantage of the "on-line" method is the fact that the machine can continue to operate.

The "off-line" methods require a momentary stop to the production since the machine in this case is only running with the starter at only a few percent of the normal full load speed. In the "off-line" washing normally the nozzles that spray the washing fluids are installed in front of the compressor low pressure first stage blades. In case of "off-line" washing, during washing operation the engine is rotating just to give to the washing fluids enough energy to scrape the foul without causing turbulence and without imparting to the fluid strong centrifugal forces that can push the fluid towards the compressor casing away from the blades to be washed. The choice of the particular positioning and assembling of the washing system is important for the washing efficiency and also for the gas turbine integrity.

According to a prior art solution, the spraying nozzles are installed inside the bellmouth of the gas turbine in a position such that the spray is directed straight at the compressor inlet in a direction almost parallel to the air flow. The disadvantage of this solution is that, in case of failure, the nozzles could cause damage to the gas turbine.

Another prior art solution, in case of machines with radial air inlet, consists in fixing the nozzles on the internal radial volute.

A drawback of both solutions is that the nozzles are inside the flow path within the machine with the possibility to create a flow distortion that will affect the performances of the machine.

Therefore, the necessity is felt of an improved washing system that can overcome the drawbacks.

BRIEF SUMMARY OF THE INVENTION

By integrating an arrangement of nozzles and manifolds for spraying a washing liquid in the supporting structure of an inlet screen at the air flow inlet of an axial compressor, a very effective solution is obtained.

A first aspect of the present invention is a washing system. The washing system is for a gas turbine engine with an axial compressor, and comprises: an inlet screen positioned at the air flow inlet of the axial compressor to protect the compressor from foreign object damage, the inlet screen comprising a supporting structure and a filtering net fixed to the supporting structure, an arrangement of nozzles and manifolds, and a washing liquid supply system connected to the arrangement; wherein the arrangement is integrated in the supporting structure.

A second aspect of the present invention is a gas turbine engine. The gas turbine engine comprises: an axial compressor, a plenum chamber located at the air flow inlet of the axial compressor, an inlet screen located in the plenum chamber to protect the compressor from foreign object damage, the inlet screen comprising a supporting structure and a filtering net fixed to the supporting structure, an arrangement of nozzles and manifolds, and a washing liquid supply system connected to the arrangement and integrated in the supporting structure.

A third aspect of the present invention is a method of washing an axial compressor of a gas turbine engine. According to the method, an inlet screen is located at the air flow inlet of the axial compressor, and a washing liquid supply system is integrated in the inlet screen.

BRIEF DESCRIPTION OF THE DRAWINGS

The accompanying drawings, which are incorporated herein and constitute a part of the specification, illustrate exemplary embodiments of the present invention and, together with the detailed description, explain these embodiments. In the drawings.

DETAILED DESCRIPTION

The following description of exemplary embodiments refers to the accompanying drawings.

The following description does not limit the invention. Instead, the scope of the invention is defined by the appended claims.

Reference throughout the specification to "one embodiment" or "an embodiment" means that a particular feature, structure, or characteristic described in connection with an embodiment is included in at least one embodiment of the subject matter disclosed. Thus, the appearance of the phrases "in one embodiment" or "in an embodiment" in various places throughout the specification is not necessarily referring to the same embodiment. Further, the particular features, structures or characteristics may be combined in any suitable manner in one or more embodiments.

Figure 1:
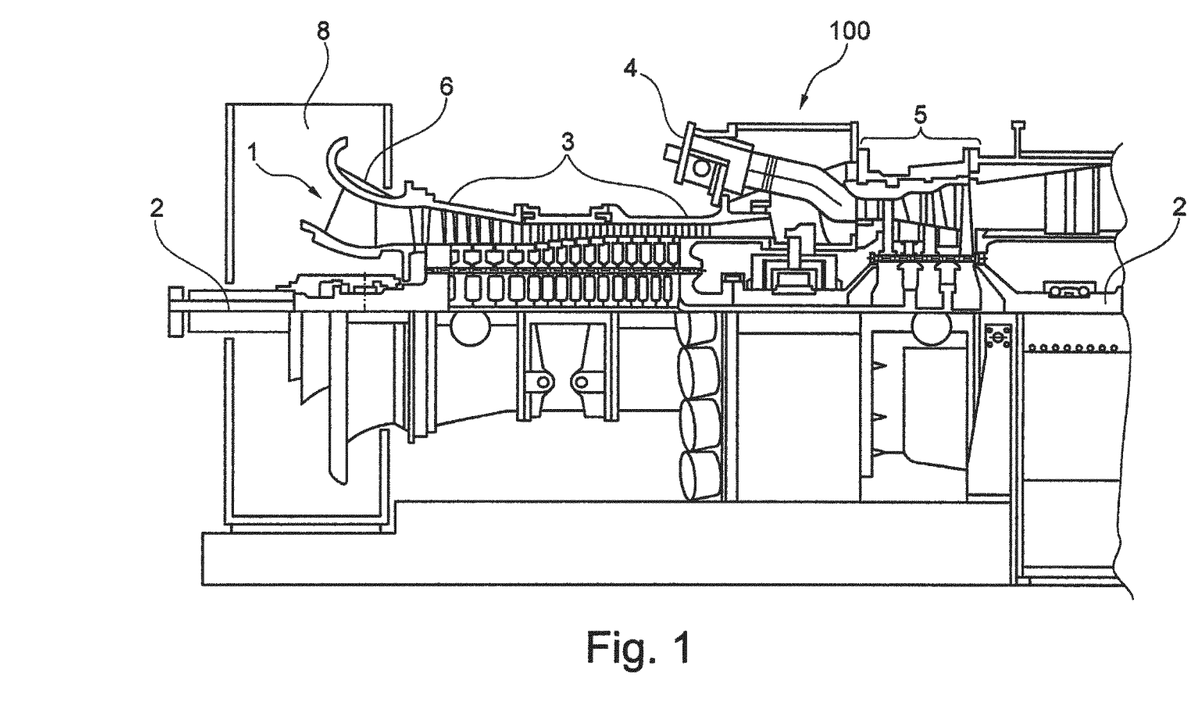
FIG. 1 is a longitudinal cross-sectional view of a gas turbine engine.

With reference to FIG. 1 there is shown an aero derivative gas turbine engine generally designated with the reference number 100. The arrow 1 represent the air flow entering the bellmouth of the gas turbine engine 100. The basic elements of a gas turbine engine are the compressor 3, the combustors 4 and the turbine 5. The gas turbine engine 100 include a shaft 2 that drives the blades of the compressor 3. The compressed air is heated by the combustors 4 and the resulting hot gases expand driving the blades of the turbine 5 thus rotating the shaft 2. Included in the gas turbine engine 100 there is also a starter motor (not shown) that serves the purpose of operating the gas turbine engine at startup and during off-line washing procedures as already said.

Gas turbine engines draw huge quantity of air containing particles that can contaminate the compressor blades and vanes. Before entering the gas turbine engine the air must be filtered in order to remove the greatest part of air particles that can contribute to fouling. A FOD screen is located in a plenum chamber 8 at the entrance of the gas turbine engine in order to stop those particles that can damage primarily the blades and vanes of the compressor 3.

Despite the use of filters, it is difficult to avoid completely the deposition and accumulation of particles on the blades and vanes of the compressor, thus it is necessary to resort to periodic washing operations in order to restore the original levels of efficiency.

The washing operations are accomplished through a series of nozzles that spray atomized washing fluid, normally water, in the interior of the gas turbine engine.

Figure 2:
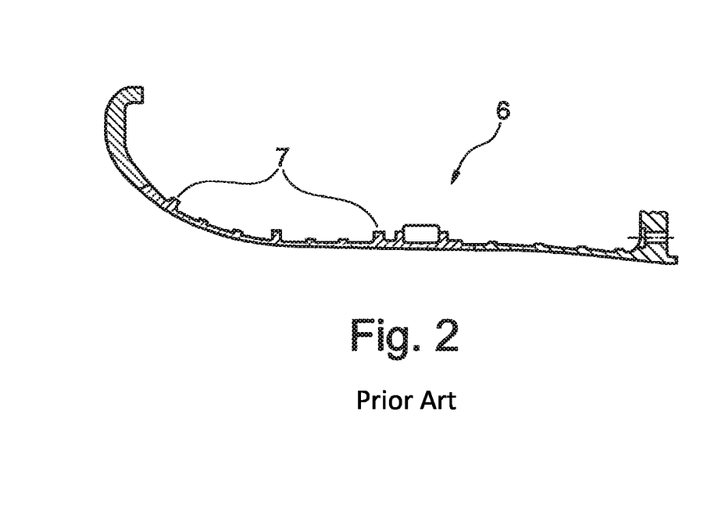
FIG. 2 is a longitudinal cross-sectional view of a bellmouth of a gas turbine engine according to the prior-art.
Figure 3:
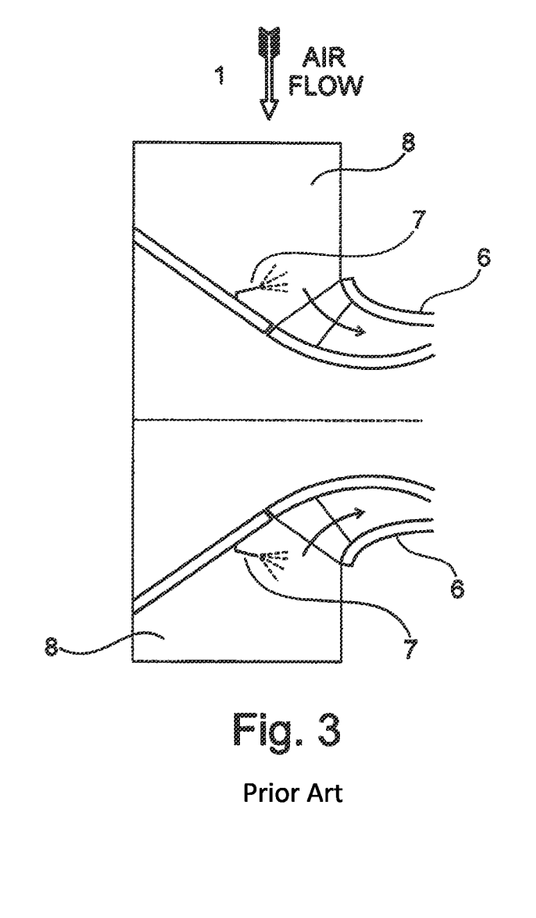
FIG. 3 is a longitudinal cross-sectional view of the inlet zone of a gas turbine engine according to the prior-art.

FIG. 2 and FIG. 3 show details of washing systems according to the prior art.

In FIG. 2 the nozzles 7 are installed in the bellmouth 6 of the gas turbine engine, in particular in the region identified by reference numeral.

FIG. 3 shows the inlet portion of a gas turbine engine where air enters radially (coming from an upper opening) and the nozzles 7 are installed on an internal radial volute (radially opposite to the bellmouth 6). The nozzles are positioned in such a way that the washing fluid can enter and penetrate the compressor, moving through it towards the exit of the machine and washing the fouling thanks to the fact that during the washing operation the rotor is rotating 1) at low speed driven by the starter engine in case of offline washing or it is rotating 2) at full load in case of online washing.

The drawbacks of these prior-art solutions are due to the fact that the nozzles installed on the inlet lateral surfaces not only can create a significant distortion of the inlet air flow, but can cause serious damages to the blades and vanes of the compressor in case that they detach from the installing surfaces.

An alternative solution consists in fixing the nozzles to the inlet plenum wall. In this case, the washing fluid is injected into the axial compressor passing through the inlet screen. Such solution has the disadvantage of a lower washing efficiency since there is no direct washing fluid flow into the compressor.

Figure 4:
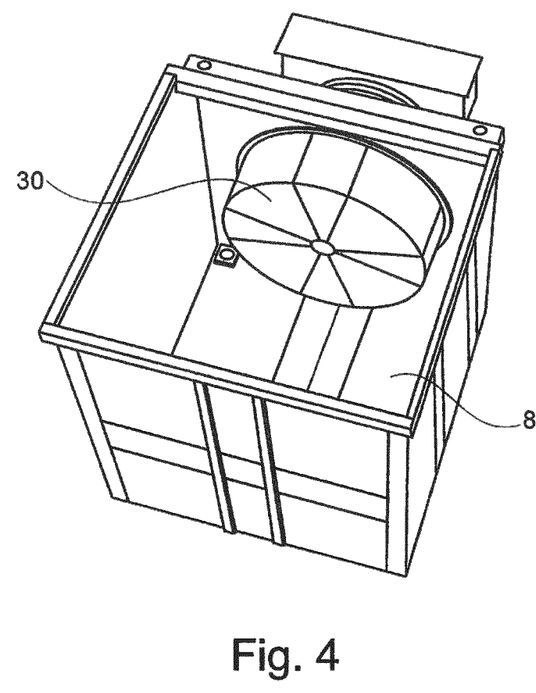
FIG. 4 is a perspective view of an of the inlet zone of an embodiment of a gas turbine (in particular a FOD screen within the plenum chamber is shown)
Figure 5:
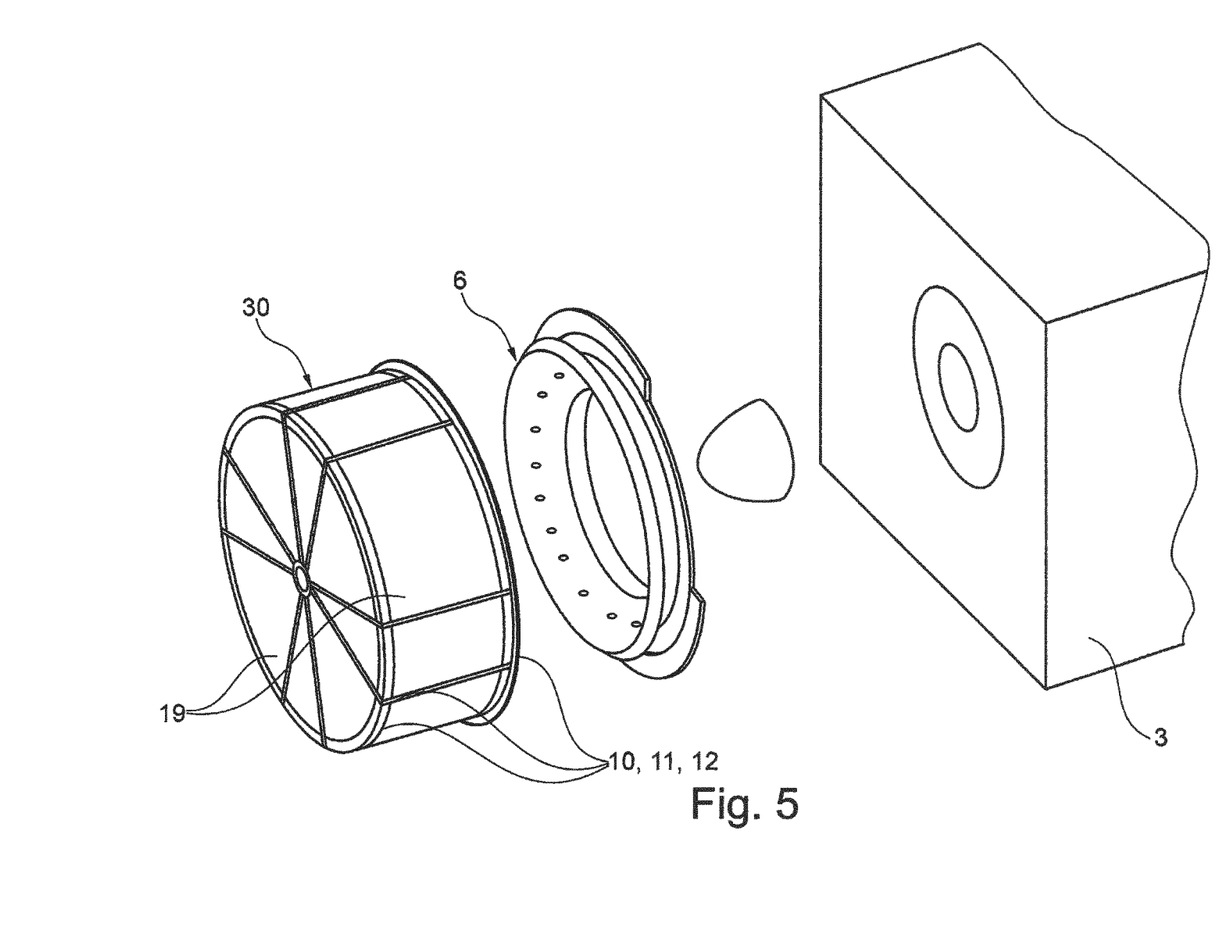
FIG. 5 is an exploded view of some of the components of the gas turbine engine shown in FIG. 4.

FIG. 4 and FIG. 5 show an inlet FOD screen 30 positioned at the inlet of the gas turbine engine 100; screen 30 is located inside plenum chamber 8.

FIG. 5 shows screen 30 as well as bellmouth 6 and a bullet nose to be place in front of the compressor 3 of the gas turbine engine.

Figure 6:
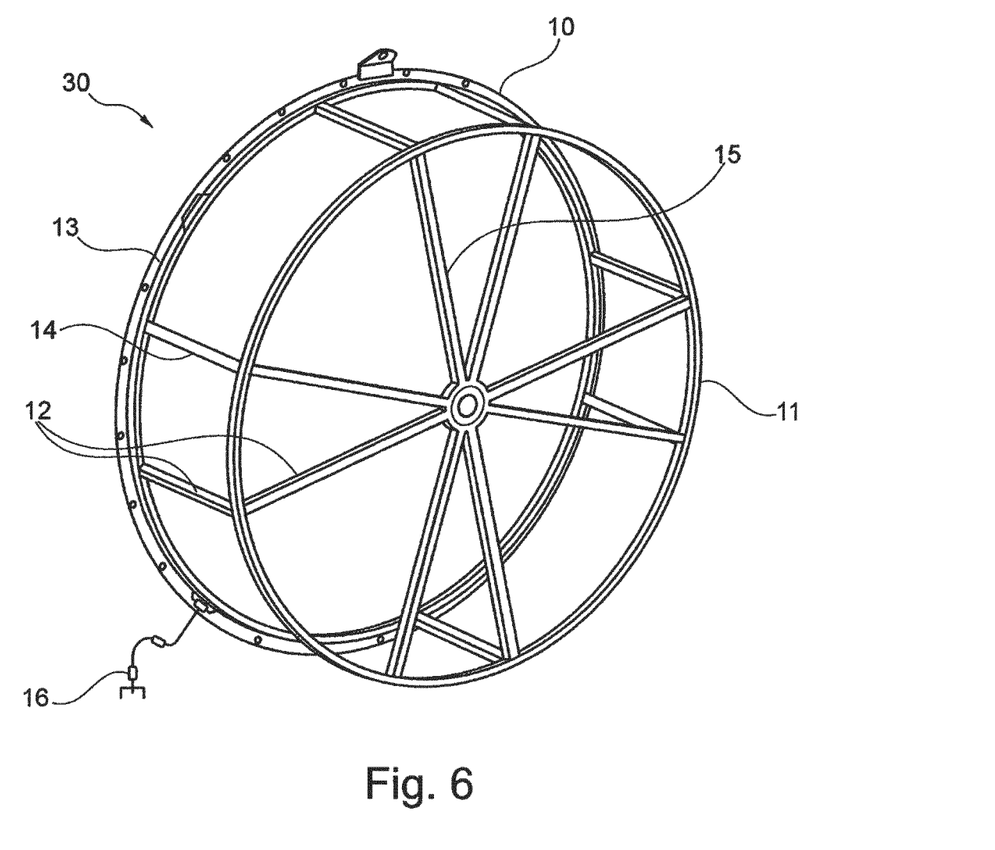
FIG. 6 is a perspective view of an embodiment of a FOD screen corresponding to the one shown in FIG. 4 and FIG. 5.

FIG. 6 is a prospective view of screen 30 in greater detail.

Screen 30 has a base positioned at the air flow inlet of the axial compressor 3. The screen 30 also has a lateral surface which develops away from the base.

The screen 30 has an axially symmetrical shape. Within the present disclosure, the wording "axially symmetrical shape" includes any shape that has a planar symmetry with regards to an arbitrary number axial planes. Any plane which contains the central axis of the compressor is defined as an "axial plane" according to the present disclosure.

In an another embodiment, the screen 30 has a three-dimensional shape, having a base and a lateral surface, for increasing the filtering capacity with respect to the base area. Both lateral and base comprising a filtering net 19 connected to the supporting structure.

According to a first embodiment, the filtering net 19 is fixed only on the base of the inlet screen 30 remote from the air flow inlet of the axial compressor 3. According to a second embodiment, the filtering net 19 can also be fixed to the lateral surface of the inlet screen 30.

More particularly, the screen 30 has the shape of a cylindrical cup, as can be seen in FIG. 6, and is formed by a filtering net and its supporting structure. The supporting structure comprises a first support ring 10 disposed at the periphery of the cylinder cup base close to the air flow inlet of the axial compressor 3 and a second support ring 11 disposed at the periphery of the other cylinder cup base remote from the air flow inlet of the axial compressor 3. The supporting structure is completed by a series of L-shaped ribs 12. L-shaped ribs 12 are formed by a set of parallel first rib segments 14 joining the two rings 10 and 11 being perpendicular to these, and by a set of second rib segments 15 positioned on the plane defined by the cylinder cup base 11. An advantage of this type of structure is that it has a very limited influence on the air flow that can pass through it without being distorted.

This structure supports the filtering net (19 in FIG. 8) that is fixed to the structure by means of a resin. The filtering net stops dangerous objects that could enter the compressor together with the air flow.

According to embodiments of the present invention, an arrangement of nozzles and manifolds for a washing fluid are mounted on the rings and ribs that form the supporting structure of the inlet FOD screen 30. A washing liquid supply system 16 is connected to the arrangement of nozzles and manifolds as shown in FIG. 6.

Figure 7:
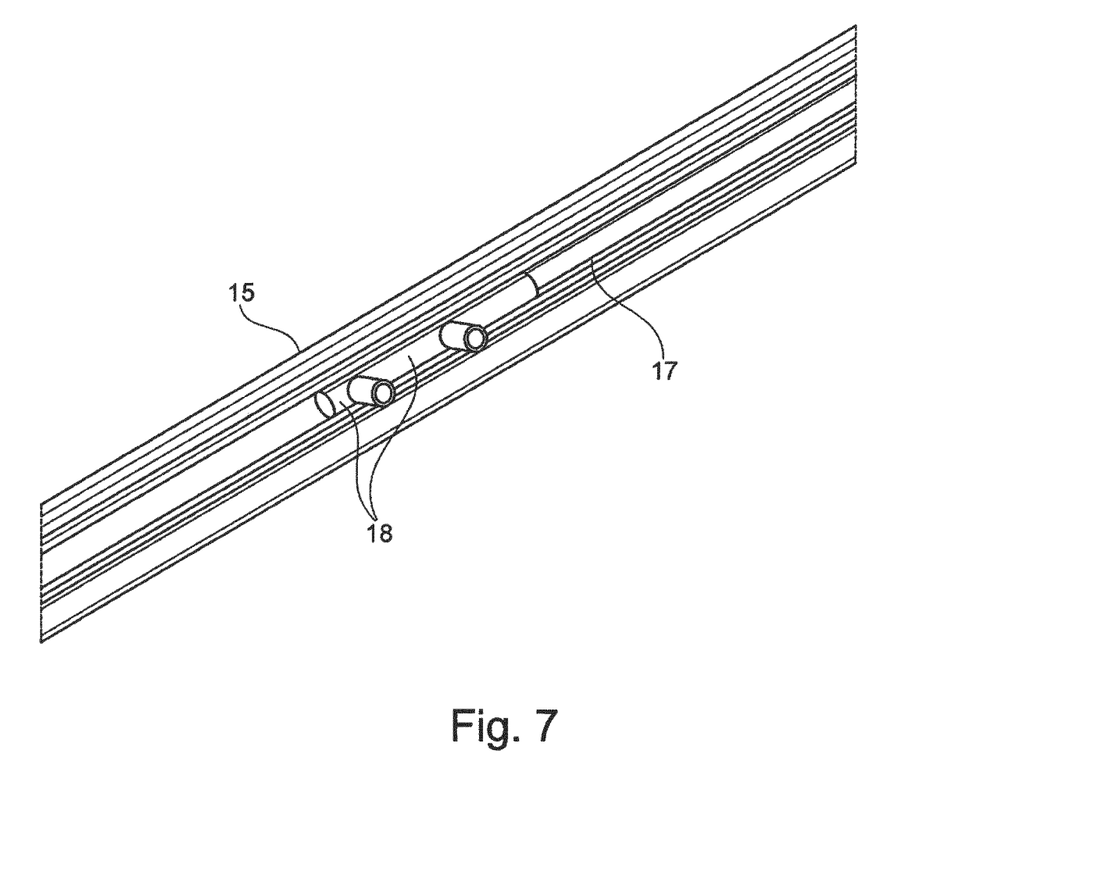
FIG. 7 is a detail of a rib forming the supporting structure of the FOD screen of FIG. 6.

According to FIG. 6, ring 10 carries a washing fluid manifold 13; washing fluid manifold 13 run along ring 10 imbedded in a resin that serves also to fix the filtering net 19; a set of washing fluid conduits 17 depart from the manifold 13 following the rib structure and bringing the washing fluid to the nozzles; conductors 17 reach only the middle point of the converging second rib segments 15 where they terminate with a washing fluid nozzle 18 or a couple of nozzles 18 (as shown in FIG. 7).

Figure 8:
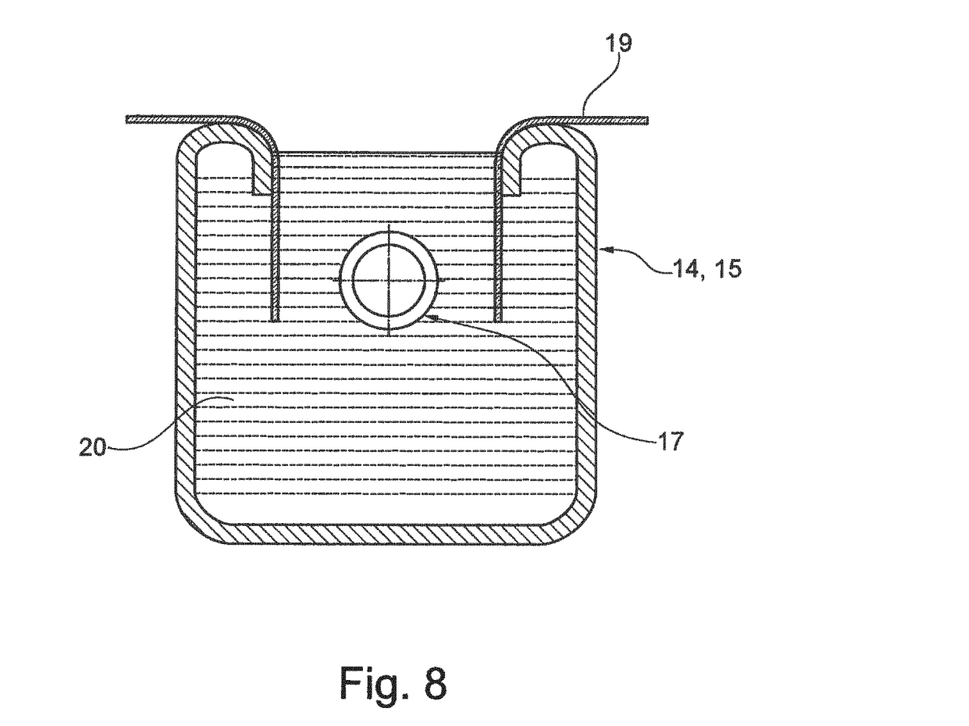
FIG. 8 is a cross sectional view of the rib of in FIG. 7.

FIG. 8 shows a detail (in cross-sectional view) of a first rib segment 14 carrying a washing fluid conductor 17; first rib segment 14 (as well as second rib segments 15) have U-shaped profile and filled with resin 20; filtering net 19 is fixed to resin 20 through the extensions of the mesh, as can be seen in the figure; washing fluid conductor 17 is completely embedded into resin 20.

The integration of the washing system, i.e. nozzles and manifolds, in the supporting structure of the inlet screen has the advantage, compared to the prior art, that the washing system does not add further impediments to the inlet fluid flow and does not distort the flow. The washing system is placed in front of the compressor 3, in particular in front of the inlet.

The nozzles may inject the washing fluid directly into the compressor and, if desired, in the same axial direction of the air flow and parallel to the axis of the axial compressor.

Also, some nozzles can be configured as spray nozzles. The spray nozzles are configured so that they can spray washing liquid in nebulized form. Other nozzles are jet nozzles, which are configured to expel a continuous stream of washing liquid. According to the embodiments described, the spray nozzles are used for online washing, while the jet nozzles are used for offline washing.

Embedding nozzles and manifolds in the resin makes it very unlikely a detachment of a nozzle or a manifold.

The manifolds are connected typically to a water supply system that may contain filtered water, eventually distilled, processed and mixed with cleaning chemicals.

Part of the washing water exiting the gas turbine engine may be collected and recycled to be used again, after being purified from the collected foul and processed, together with fresh water as clean washing water.

The inlet screen and the integrated washing system increase the efficiency of the washing process, have no impact on the airflow, eliminates the risk of foreign objects that can enter and damage the axial compressor.

Such system reduces the downtime of the gas turbine engine and increases the percentage of efficiency recovery (after washing) with clear economic benefits.

This written description uses examples to disclose the invention, including the preferred embodiments, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A washing system for a gas turbine engine with an axial compressor, the washing system comprising:
    an inlet screen positioned at the air flow inlet of the axial compressor to protect the compressor from foreign object damage, the inlet screen having an axially symmetrical shape and comprising support structure and a filtering net, the support structure comprising a first base positioned proximate to the air flow inlet of the axial compressor, a second base positioned distal of the air flow inlet, and a lateral surface extending from the first base toward the second base;
    an arrangement of nozzles and manifolds integrated in the supporting structure; and
    a washing liquid supply system connected to the arrangement,
    wherein the filtering net is fixed by resin to at least the second base and the lateral surface of the support structure, and the nozzles and the manifolds are embedded in the resin.

2. The washing system of claim 1, wherein the lateral surface has an axially symmetrical shape with respect to the central axis of the compressor.

3. The washing system of claim 1, wherein the nozzles are disposed to inject washing liquid in a direction substantially parallel to the air flow towards the air flow inlet of the axial compressor and to the axis of the axial compressor.

4. The washing system of claim 3, wherein the spray nozzles are disposed and arranged only for on-line washing and the jet nozzles are disposed and arranged only for off-line washing.

5. The washing system of claim 1, wherein some nozzles are spray nozzles configured to spray washing liquid in nebulized form, and some nozzles are jet nozzles configured to expel a continuous stream of washing liquid.

6. The washing system of claim 1, wherein the washing liquid supply system comprises a unit for filtering and/or processing water and/or a unit for mixing water with a cleaning substance.

7. The washing system of claim 6, wherein the water supply system comprises a unit for purifying the recycled water.

8. The washing system of claim 1, wherein the washing liquid supply system comprises a recycling system to recycle at least a part of the water exiting the gas turbine engine.

9. A washing system for a gas turbine engine with an axial compressor, the washing system comprising:
    an inlet screen positioned at the air flow inlet of the axial compressor to protect the compressor from foreign object damage, the inlet screen shaped like a cylindrical cup and comprising a filtering net and a supporting structure;
    an arrangement of nozzles and manifolds integrated in the supporting structure; and
    a washing liquid supply system connected to the arrangement of nozzles and manifolds,
    wherein the supporting structure comprises:
        a first support ring forming a periphery of the cylinder cup proximate to the air flow inlet of the axial compressor,
        a second support ring spaced away from the first support ring and forming a periphery of the cylinder cup distal to the air flow inlet of the axial compressor, and
        a plurality of L-shaped ribs, each rib of the plurality of L-shaped ribs comprising a first segment and a second segment that is longer than the first segment, the respective first segments of each the plurality of L-shaped ribs are parallel and spaced-apart relative to each other and extend between the first support ring and the second support ring to structurally join the rings, and the respective second segments of each the plurality of L-shaped ribs are disposed radially in the second support ring and are joined at its center, and wherein the filtering net is fixed to the supporting structure and defines a lateral surface extending between the first support ring and the second support ring.

10. A gas turbine engine comprising:
an axial compressor;
a plenum chamber located at an air flow inlet of the axial compressor; and
a washing system comprising:
   an inlet screen positioned at the air flow inlet of the axial compressor to protect the compressor from foreign object damage, the inlet screen having an axially symmetrical shape and comprising support structure and a filtering net, the support structure comprising a first base positioned proximate to the air flow inlet of the axial compressor, a second base positioned distal of the air flow inlet, and a lateral surface extending from the first base toward the second base;

an arrangement of nozzles and manifolds integrated in the supporting structure; and a washing liquid supply system connected to the arrangement, wherein the filtering net is fixed by resin to at least the second base and the lateral surface of the support structure, and the nozzles and the manifolds are embedded in the resin.

* * * * *